United States Patent

Miyasaka

[11] Patent Number: 5,871,863
[45] Date of Patent: Feb. 16, 1999

[54] LITHIUM ION SECONDARY BATTERY

[75] Inventor: Tsutomu Miyasaka, Kanagawa, Japan

[73] Assignee: Fuji Photo Film Co., Ltd., Kanagawa, Japan

[21] Appl. No.: 709,034

[22] Filed: Sep. 6, 1996

[30] Foreign Application Priority Data

Sep. 6, 1995 [JP] Japan .................................. 7-228732
Feb. 27, 1996 [JP] Japan .................................. 8-039564

[51] Int. Cl.[6] .................................................. H01M 4/50
[52] U.S. Cl. ........................ 429/218; 429/223; 429/224
[58] Field of Search .................................. 429/194, 197, 429/218, 224, 223; 423/599

[56] References Cited

U.S. PATENT DOCUMENTS

| | | | |
|---|---|---|---|
| 5,240,794 | 8/1993 | Thackeray et al. | 429/224 |
| 5,370,710 | 12/1994 | Nagaura et al. | 29/623.1 |
| 5,425,932 | 6/1995 | Tarascon | 423/599 |
| 5,443,929 | 8/1995 | Yamamoto et al. | 429/224 |
| 5,597,664 | 1/1997 | Ellgen | 429/224 |

*Primary Examiner*—Anthony Skapars
*Attorney, Agent, or Firm*—Sughrue, Mion, Zinn, Macpeak & Seas, PLLC

[57] ABSTRACT

In a lithium ion secondary battery having a positive electrode, a negative electrode, non-aqueous electrolyte, and a container sealing the electrodes anrd electrolyte therein, the positive electrode is formed of a positive electrode active material which is produced by electrochemically intercalating lithium ions into lithium manganese oxide in the container to give a positive electrode active material precursor comprising lithium manganese oxide of which lithium ion contents are increased, and then releasing lithium ions from the positive electrode active material precursor in the container, and the negative electrode is formed of a negative electrode active material which is produced by intercalating the released lithium ions into a negative electrode active material precursor of a metal oxide in the container.

17 Claims, 1 Drawing Sheet

LITHIUM ION SECONDARY BATTERY

FIELD OF THE INVENTION

This invention relates to a lithium ion secondary battery and a precursor for producing the lithium ion secondary battery.

BACKGROUND OF THE INVENTION

A lithium ion secondary battery is known as an advantageous secondary battery which is able to give a high voltage of about 4 volts and a high discharge capacity. As the positive electrode active material of the lithium ion secondary battery, $LiMn_2O_4$ having the spinel crystal structure, as well as $LiMnO_2$, $LiCoO_2$, $LiCo_{1-x}Ni_xO_2$ or $LiNiO_2$ which has the rock salt crystal structure have been generally employed. The $LiCoO_2$ having the rock salt crystal structure shows higher voltage and higher discharge capacity than other oxides and therefore is advantageous. However, the $LiCoO_2$ has such drawbacks that cobalt is high in its cost and less available than other metals, and moreover may cause environmental pollution if battery wastes containing the lithium cobalt oxide are left outside Japanese Patent Provisional Publication H3(1991)-147276 proposes a lithium ion secondary battery using $LiMn_2O_4$ of the spinel crystal structure as the material for its positive electrode, that is, cathode. Manganese is less expensive and easily available, and moreover scarcely causes environmental pollution. However, $LiMn_2O_4$ gives a charge capacity (corresponding to amount of releasable lithium ions) per unit volume less than $LiCoO_2$ by 10 to 20%. This means that if the $LiMn_2O_4$ is combined with a negative electrode active material of high capacity to prepare a secondary battery, the volume of the $LiMn_2O_4$ (namely, positive electrode active material) to be used should be increased so as to balance its capacity with the high capacity of the negative electrode active material. As a result, the amout of the negative electrode active material encased in a container of a battery should be reduced, and then the battery capacity lowers.

Japanese Patent Provisional Publication H4(1992)-147573 describes a lithium ion secondary battery using $Li_{1+M}Mn_2O_4(x>0)$ as the positive electrode active material precursor in combination of a negative electrode active material precursor such as carbonaceous material. Such positive electrode active material precursor—negative electrode active material precursor combination in a container of a battery is electrochemically converted into a positive electrode active material—negative electrode active material combination by electrically charging thus prepared battery so as to release lithium ions from the positive electrode active material precursor and intercalate the released lithium ions into the negative electrode active material precursor in the container.

The $Li_{1+x}Mn_2O_4$ having a lithium ion amount higher than $LiMn_2O_4$ is advantageous because it gives a charge capacity higher than $LiMn_2O_4$. In the lithium ion secondary battery described in the last Publication, the positive electrode active material of $Li_{1+x}Mn_2O_4$ is produced electrochemically once in an electric cell or chemically in a known process outside an electric cell and then placed in a container of a final battery product. $Li_{1+x}Mn_2O_4$ is known to be extremely unstable and easily oxidized. Therefore, this process and the secondary battery prepared by this process may cause problems in industrial preparation and use.

SUMMARY OF THE INVENTION

It is a primary object of the present invention to provide a lithium ion secondary battery which gives a high voltage and high discharge capacity.

It is another object of the present invention to provide the lithium ion secondary battery which is easily prepared without problems attached to the lithium ion secondary battery of prior art.

It is a further object of the invention to provide the lithium ion secondary battery which is easily prepared with high reliability and reproductivity.

It is a still further object of the invention to provide the lithium ion secondary battery which is easily prepared with improved cost-perfomance.

In one aspect, the present invention resides in a lithium ion secondary battery comprising a positive electrode, a negative electrode, non-aqueous electrolyte, and a container sealing the electrodes and electrolyte therein, wherein the positive electrode comprises a positive electrode active material which is produced by electrochemically intercalating lithium ions into lithium manganese oxide in the container to give a positive electrode active material precursor comprising lithium manganese oxide of which lithium ion contents are increased, and then releasing lithium ions from the positive electrode active material precursor in the container;

and the negative electrode comprises a negative electrode active material which is produced by intercalating the released lithium ions into a negative electrode active material precursor comprising a metal oxide in the container.

In another aspect, the present invention resides in a lithium ion secondary battery precursor comprising a positive electrode precursor, a negative electrode precursor, non-aqueous electrolyte, and a container sealing the electrode precursors and electrolyte therein, wherein the positive electrode precursor comprises a positive electrode active material precursor which is produced by electrochemically intercalating lithium ions into lithium manganese oxide in the container to increase the lithium ion content of the lithium manganese oxide;

and the negative electrode precursor comprises a negative electrode active material precursor comprising a metal oxide.

In a further aspect, the invention resides in a lithium ion secondary battery precursor comprising a positive electrode precursor, a negative electrode precursor, non-aqueous electrolyte, and a container sealing the electrode precursors and electrolyte therein, wherein the positive electrode precursor comprises lithium manganese oxide, and has a lithium metal or a lithium alloy in the vicinity of the lithium manganese oxide under the condition that the lithium metal or lithium alloy is in electric contact with the lithium manganese oxide; and the negative electrode precursor comprises a negative electrode active material precursor comprising a metal oxide.

In a still further aspect, the invention resides in a lithium ion secondary battery precursor comprising a positive electrode precursor, a negative electrode precursor, non-aqueous electrolyte, and a container sealing the electrode precursors and electrolyte therein, wherein the positive electrode precursor comprises lithium manganese oxide; and the negative electrode precursor comprises a negative electrode active material precursor comtprising a metal oxide, and has a lithium metal or a lithium alloy in the vicinity of the negative electrode active material precursor under the condition that the lithium metal or lithium alloy is brought into electric contact with the lithium manganese oxide through an externally set electric circuit.

PREFERRED EMODIMENTS OF THE INVENTION

Figure 1:
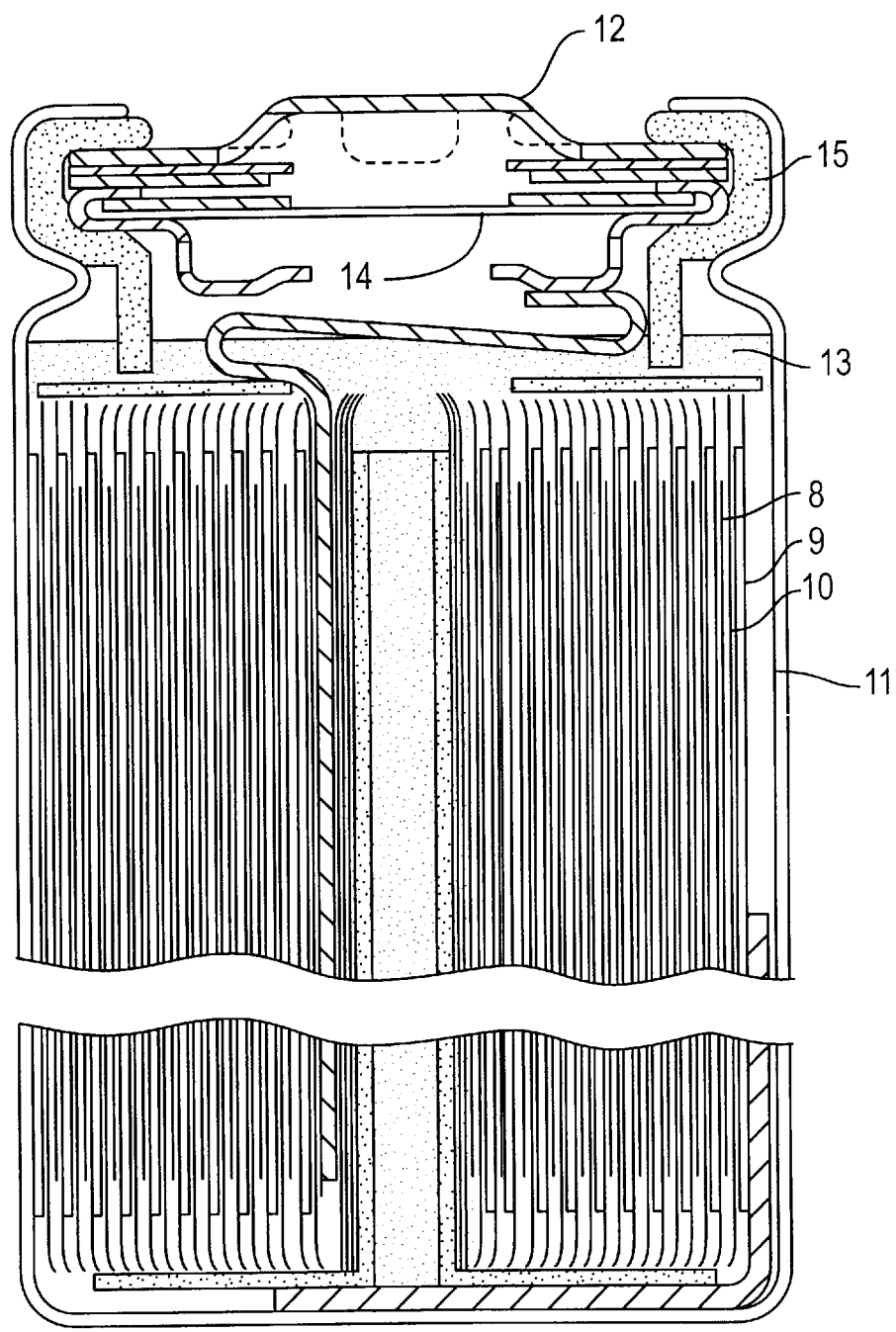
FIG. 1 is a schematic section of a typical lithium ion secondary battery according to the invention.

The preferred emments of the lithium ion secondary battery of the invention and the lithium ion secondary battery precursor (which is converted into the lithium ion secondary battery of the invention by electrochemical processing) are set forth below 1) The positive electrode active material precursor has a tetragonal crystal structure and is represented by the formula of $Li_{1+x}Mn_2O_4$ under the condition of $0.3<x<1$, and the positive electrode active material has a cubic crystal structure and is represented by the formula of $Li_yMn_2O_4$ under the condition of $0<y<0.3$.

2) The positive electrode contains, as a sub-active material, lithium cobalt oxide having the formula of $Li_xCoO_2$ under the condition of $0.5<x\leq1$, or lithium nickel or cobalt-nickel oxide having the formula of $Li_xCo_yNi_zO_2$ under the conditions of $0.5<x\leq1$, $0\leq y\leq1$, and $0\leq 1$.

3) The positive electrode active material precursor is produced in the container by electrochemical self-discharge between lithium manganese oxide and a lithium metal or a lithium alloy.

4) The positive electrode active material precursor is produced in the container by electrochemical discharge between lithium maganese oxide and a lithium metal or a lithium alloy which is placed near the negative electrode active material precursor, utilizing an externally set electric circuit.

5) The negative electrode active material precursor comprises an amorphous mtal oxide which has a tin atom and at least one other metal atom and into which the lithium ions have been intercalated.

6) The negative electrode active material precursor comprises an amorphous metal oxide which has a tin atom and at least one other metal atom and which is represented by the formula of $SnL_xO_z$ in which L is at least one atom selected from the group consisting of Al, B, P, Si, Li, Na, K, Rb, Cs, Be, Mg, Ca, Sr, Ba, Sc, Y, lanthanides, and halogens, and k and z are numbrs satisfying the conditions of $0.2\leq k\leq 2$ and $1\leq z\leq 6$, respectively, or the formula of $Sn_dQ_{1-d}L_xO_z$ in which Q is a transition metal atom, L is at least one atom selected from the group consisting of Al, B, P, Si, Li, Na, K, Rb, Cs, Be, Mg, Ca, Sr, Ba, Sc, Y, lanthanides, and halogens, and d, k and z are numbers satisfying the conditions of $0.1\leq d\leq 0.9$, $0.2\leq k\leq 2$, and $1\leq z\leq 6$, respectively.

7) The ratio of the amout of lithium ions to be released from the negative electrode active material until the discharge voltage of the battery lowers to 3V in a discharge step, to the amnount of lithium ions intercalated into the negative electrode active material precursor is lower than $1/(1+x)$ wherein x is as defined in 1) above.

8) The positive electrode active material precursor is produced in the container by electrochemical self-discharge between lithium manganese oxide and a lithium metal or a lithium alloy.

9) The positive electrode active material precursor is produced in the container by electrochemical discharge between lithium manganese oxide and a lithium metal or a lithium alloy which is placed near the negative electrode active material precursor, utilizing an externally set electric circuit.

10) The lithium manganese oxide has a spinel crystal structure.

11) The lithium manganese oxide has a spinel crystal structure and is represented by the formula of $Li_{1+x}[Mn_{2-y}]O_4$ under the condition of $0\leq x<1.7$ and $0\leq y<0.7$, or the formula of $Li_{1-x}[Mn_{2-y}]O_4$ under the condition of $0<x<1.0$ and $0\leq y<0.5$.

12) The positive electrode precursor contains, as a sub-active material, lithium cobalt oxide having the formula of $Li_xCoO_2$ under the condition of $0.5<x\leq1$, or lithium nickel or cobalt-nickel oxide having the formula of $Li_xCo_yNi_zO_2$ under the condition of $0.5<x\leq1$, and $0<z\leq1$.

The lithium ion secondary battery of the invention and the lithium ion secondary battery precursor of the invention, as well as processes for the preparation of the battery and its precursor are described below.

The lithium ion secondary battery of the invention employs a positive electrode active material (i.e., an active material of cathode) prepared from lithium manganese oxide. The lithium manganese oxide preferably is that having the spinel crystal structure, which give a high voltage. The oxide of spinel type has a crystal structure of $A(B_2)O_4$, in which oxygen anions are arranged at the tops of tetragonal and hexagonal planes of the cubic close-packed structure. Based on the arrangements of the cation "A", the spinel structures are classified into a regular (or normal) spinel, that is, $A(B_2)O_4$, and a reverse spinel, that is, $A(A,B)O_4$. There is an intermediate spinel structure, that is, $A_xB_y(A_{1-x},B_{1-y})O_4$. A representative lithium manganese oxide of the regular spinel is $LiMn_2O_4$. In this structure, a half of Ma cations are trivalent and another half are tetravalent. $\lambda$-$MnO_2$, that is a known active material, has the crystal structure of $LiMn_2O_4$ from which lithium is removed, that is called a defective spinel structure. In this crystal structure, Mn cations are all tetravalent. The lithium manganese oxide employed in the invention can have any spinel structures, such as regular spinel, reverse spinel, intermediate spinel, and defective spinel including a spinel of non-stoichiometric composition.

An example of the lithium manganese oxide (i.e., lithium-containing manganese oxide) employable in the invention is represented by the formula of $Li_{1+x}[Mn_{2-y}]O_4$ ($0\leq x<1.7$, $0\leq y<0.7$). Examples of the oxides include $Li_4Mn_5O_{12}$ (which is described by $[Li_{1/3}Mn_{5/3}]O_4$ in the manner of representation for spinel structure). The examples also include the following oxides in which the subscripts attached to the formulas can be equally multiplied or divided: $Li_4Mn_4O_9$, $Li_2MnO_3$, $Li_5Mn_4O_9$, and $Li_4Mn_5O_{12}$.

Another example of the lithium manganese oxide employable in the invention can be described by the formula of $Li_{1-x}[Mn_{2-y}]O_4$ ($0\leq x<1.0$, $0\leq y<0.5$). Preferred is an oxide having the formula of $Li_{1-x}[Mn_{2-y}]O_4$ ($0.20<x<1.0$, $0<y<0.2$). Examples of the oxides of the formula include $Li_2Mn_5O_{11}$ (which is described by $Li_{1-x}[Mn_{2-y}]O_4$ ($x=0.273$, $y=0.182$) in the mamner of representation for spinel structure) which is a non-stoichiometric spinel and described in Japanese Patent Provisional Publication H4(1992)-240117. Also preferred is an oxide having the formula of $Li_{1-x}[Mn_{2-y}]O_4$ ($0<x\leq0.20$, $0<y<0.4$) such as an oxide of $Li_2Mn_4O_9$. The examples further include the following oxides in which the subscripts attached to the formulas can be equally multiplied or divided: $Li_4Mn_{16.5}O_{35}$, $Li_2Mn_{7.5}O_{16}$, and $Li_{O.7}MnO_4$.

The lithium manganese oxide can be produced by a conventional method such as a solid-phase reaction of a lithium salt and a manganese salt or a manganese oxide at an elevated temperature. If lithium carbonate and manganese dioxide are employed, the reaction is performed at a temperature of 350° to 900° C., preferably 350° to 500° C., for a period of 8 to 48 hours. If lithium nitrate (having a low melting temperature of 261° C.) is employed, the reaction temperature is in the range of 300° to 900° C., preferably 300° to 500° C. Examples of employable manganese oxides include $\lambda$-$MnO_2$, $MnO_2$ produced by electrolytic synthesis (EMD), chemically produced $MnO_2$ (CMD), and their mixtures. As a raw material for the lithium component, a lithium manganese oxide (such as $Li_2Mn_4O_9$) also can be employed. The lithium manganese oxide can be mixed with a manganese compound such as manganese dioxide and fired at a temperature of 350° to 500° C.

The above-described lithium manganese oxide can be employed in combination with one or more of other lithium manganese oxides such as $LiMnO_2$ of the rock salt crystal structure and $Li_{1+x}Mn_2O_4$ ($0 \leq x \leq 0.5$, which is produced by chemically inserting Li ion into $LiMn_2O_4$), and $Li_{1-x}Mn_2O_4$ ($0 \leq x \leq 0.5$, which is produced by chemically removing Li ion from $LiMn_2O_4$).

The lithium manganese oxide can be employed further in combination with a lithium-containing transition metal oxide which serves as sub-active material. An preferred example of the sub-active material is lithium cobalt oxide ($Li_xCoO_2$, $0.5 \leq x \leq 1$, which gives a high voltage and high electric capacity). Also preferred is lithium cobalt-nickel oxide ($Li_xCo_yNi_zO_2$, $0.5 < x \leq 1$, $0 \leq y \leq 1$, $0 < z \leq 1$). The sub-active material may be a solid solution made of cobalt, other transition metal elements, non-transition metal elements, an alkali metal, and/or lanthanides.

The sub-active material can be employed in combination with the lithium manganese oxide in the weight ratio of $2/8$ to $1/9$ (former/latter), preferably $3/7$ to $7/3$.

The lithium manganese oxide preferably is crystalline but may be amorphous or a mixture of a crystalline material and an amorphous material.

The negative electrode active material (i.e., anode active material) preferably employed in the lithium ion secondary battery of the invention is a lithium-containing metal oxide of low electric potential which is produced in the container of the final battery product by intercalating lithium ions into a metal oxide containing almost no lithium ion in the container. The term of "metal oxide containing almost no lithium ion" means "metal oxide containing almost no movable lithium ion". Such negative electrode active material can give a lithium ion secondary battery of high battery capacity when it is employed in combination with the positive electrode active material of the invention.

The negative electrode active material is, as described above, produced by intercalating lithium ions into a negative electrode active material precursor of a metal oxide in the container of the final battery product. The metal oxide preferably contains a tin atom and one or more other atoms. Preferred are metal oxides having one of the following two formulas:

$$SnL_xO_z \quad (1)$$

In the formala, L represents at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides) and halogen atoms. k and z are numbers satisfying the conditions of $0.2 \leq k \leq 2$ and $1 \leq z \leq 6$, respectively.

Among the tin-containing metal oxides of the formula (1), a compound of $SnT_hR_iO_z$ (in which T is at least one atom selected from the group consisting of Al, B, P, element of Groups 1 to 3 of Periodic Table, and halogens, and h, i and z are numbers satisfying the conditions of $0.2 \leq h \leq 2$, $0.01 \leq i \leq 1$, $0.2 \leq h+i \leq 2$, and $1 \leq z \leq 6$, respectively) is particularly preferred.

$$Sn_dQ_{1-d}L_xO_z \quad (2)$$

In the formula, Q is a transition metal atom, L is at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides), and halogens, and d, k and z are numbers satisfying the conditions of $0.1 \leq d \leq 0.9$, $0.2 \leq k \leq 2$, and $1 \leq z \leq 6$, respectively.

The metal oxide for the preparation of the negative electrode active material preferably is amrphous material when it is placed in the container of the final battery product. The term of "amorphous material", in the invention means a material which gives a broad scattered band having its main peak in the range of 20° to 40° (in terms of 2θ) in X-ray diffraction using Cu-K α rays. In the scattered band, a diffraction line may be present. The diffraction line in the range of 40° to 70° (in term of 2θ) preferably has a strength as much as 500 times or less (more preferably as much as 100 times or less, and moreover as much as 5 times or less) than the diffraction line in the range of 20° to 40° (in term of 2θ). Most preferably, there appears no diffraction lines representing a crystalline structure.

Examples of the tin-containing metal oxides for the negative electrode active material precursor include the following compounds: $SnSi_{0.8}P_{0.2}O_{3.1}$, $SnSi_{0.5}Al_{0.1}B_{0.2}P_{0.2}O_{1.95}$, $SnSi_{0.8}B_{0.2}O_{2.9}$, $SnSi_{0.8}Al_{0.2}O_{2.9}$, $SnSi_{0.6}Al_{0.1}B_{0.2}O_{1.65}$, $SnSi_{0.3}Al_{0.1}P_{0.6}O_{2.25}$, $SnSi_{0.4B}B_{0.2}P_{0.4}O_{2.1}$, $SnSi_{0.6}Al_{0.1}B_{0.5}O_{2.1}$, $SnB_{0.5}P_{0.5}O_3$, $SnAl_{0.3}B_{0.5}P_{0.2}O_{2.7}$, $SnK_{0.2}PO_{3.6}$, $SnRb_{0.2}Al_{0.05}P_{0.8}O_{3.25}$, $SnAl_{0.3}B_{0.7}O_{2.5}SnBa_{0.1}Al_{0.15}P_{1.45}O_{4.7}$, $SnLa_{0.1}Al_{0.1}P_{0.9}O_{3.55}$, $SnNa_{0.1}Al_{0.05}B_{0.45}O_{1.8}$, $SnLi_{0.2}B_{0.5}P_{0.5}O_{3.1}$, $Sn_{Cs0.1}B_{0.4}P_{0.4}O_{2.65}$, $SnBa_{0.1}B_{0.4}P_{0.4}O_{2.7}$, $SnCa_{0.1}Al_{0.15}B_{0.45}P_{0.55}O_{3.9}$, $SnY_{0.1}Al_{0.3}B_{0.6}P_{0.6}O_4$, $SnRb_{0.2}Al_{0.1}B_{0.3}P_{0.4}O_{2.7}$, $SnCs_{0.2}Al_{0.1}B_{0.3}P_{0.4}O_{2.7}$, $SnCs_{0.1}Al_{0.1}B_{0.4}P_{0.4}O_{2.8}$, $SnK_{0.1}Cs_{0.1}B_{0.4}P_{0.4}O_{2.7}$, $SnBa_{0.1}Cs_{0.1}B_{0.4}P_{0.4}O_{2.75}$, $SnMg_{0.1}K_{0.1}B_{0.4}P_{0.4}O_{2.75}$, $SnCa_{0.1}K_{0.1}B_{0.4}P_{0.5}O_3$, $SnBa0.1K0.1Al0.1B0.31P0.4O2.75SnMg_{0.1}Cs_{0.1}Al_{0.1}B_{0.3}P_{0.4}O_{2.75}$, $SnCa_{0.1}K_{0.1}Al_{0.1}B_{0.3}P_{0.4}O_{2.75}$, $SnMg_{0.1}Rb_{0.1}Al_{0.1}B_{0.3}P_{0.4}O_{2.75}$, $SnCa_{0.1}B_{0.2}P_{0.2}F_{0.2}O_{2.6}$, $SnMg_{0.1}Cs_{0.1}B_{0.4}P_{0.4}F_{0.2}O_{3.3}$, $SnMg_{0.1}Al_{0.2}B_{0.4}P_{0.4}F_{0.2}O_{2.9}$, $Sn_{0.5}Mn_{0.5}Mg_{0.1}B_{0.9}O_{2.45}$, $Sn_{0.5}Mn_{0.5}Ca_{0.1}P_{0.9}O_{3.35}$, $Sn_{0.5}Ge_{0.5}Mg_{0.1}P_{0.9}O_{3.35}$, $Sn_{0.5}Fe_{0.5}Ba_{0.1}P_{0.9}O_{3.35}$, $Sn_{0.5}Fe_{0.5}Al_{0.1}B_{0.9}O_{2.5}$, $Sn_{0.8}Fe_{0.2}Ca_{0.1}P_{0.9}O_{3.35}$, $Sn_{0.3}Fe_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$, $Sn_{0.2}Ge_{0.8}Ba_{0.1}P_{0.9}O_{3.35}$, $Sn_{1.0}Al_{0.1}B_{0.5}P_{0.5}O_{3.35}$, $Sn_{1.0}Cs_{0.1}B_{0.5}P_{0.5}O_{3.05}$, $Sn_{1.0}Cs_{0.1}Al_{0.1}B_{0.5}P_{0.5}O_{3.20}$, $Sn_{1.0}Cs_{0.1}Al_{0.3}B_{0.5}P_{0.5}O_{3.50}$, $Sn_{1.0}Cs_{0.1}Ge_{0.05}Al_{0.1}B_{0.5}P_{0.5}O_{3.30}$, and $Sn_{1.0}Cs_{0.1}Ge_{0.05}Al_{0.3}B_{0.5}P_{0.5}O_{3.60}$.

The negative electrode active material of the lithium ion secondary battery of the invention is produced by intercalating lithim ions electrochemically into the negative electrode active material precursor such as those described above. The intercalation is performed by electrically charging a battery precursor which comprises a positive electrode active material precursor, a negative electrode active material precursor, and a nonaqueous electrolyte containing lithium ions. The negative electrode active material preferably shows the ratio of the amount of lithium ions to be released from the negative electrode active material until the discharge voltage of the battery lowers to 3V in a discharge step, to the amount of lithium ions intercalated into the negative electrode active material precursor is lower than $1/(1+x)$ wherein x is "x" of the formula of $Li_{1+x}Mn_2O_4$.

There is no specific limitation on the amount of lithium ions to be intercalated into the negative electrode active material. For example, the lithium ion is preferably intercalated into the material so as to show 0.05 volt, more preferably 0.1 volt, most preferably 0.15V, against Li-Al alloy (80-20 wt. %). In these cases, the amount of the intercalated lithium ion becomes to correspond to 3 to 10 equivalent amounts depending on the electric potential. The electric capacity resulting from the intercalation generally reaches a high value such as about 500 mAh/g. In consideration of the desired electric capacity on the negative electrode active material, the amounts of the lithium manganese oxide (material for preparing the positive electrode active material precursor) and a lithium metal (or lithium alloy) to be placed on the positive electrode side are determined. For instance, the total equivalents of lithium ion releasable from the lithium manganese oxide and the lithium metal (or lithium alloy) preferably is in the range of 0.5 to 2 as much as the equivalent of lithium ion to be intercalated into the negative electrode active material precursor.

The positive electrode active material (and its precursor, and the lithium manganese oxide for the preparation of the precursor) and the negatic electrode active material (and its precursor) preferably are in the form of particles having a mean diameter of 0.03 to 50 $\mu$m, more preferably 0.1 to 20 $\mu$m. The mean diameter corresponds to a mode diameter representing the maximum frequency point which is determined, for instance, by preparing an average value of values determined by microscopic observation or by measurement utilizing an apparatus for measuring particle size distribution. The active materials preferably have a specific surface area of 0.1 to 50 $m^2/g$. The positive electrode active material and its precursor preferably has a specific surface area of 1 to 10 $m^2/g$.

The preparation of the positive electrode active material precursor from the lithium manganese oxide or a composition comprising the lithium manganese oxide is described below.

The positive electrode active material precursor is prepared by activation of the lithium manganese oxide or its composition in the container of the final battery product. The term of "activation" is performed by electric charging to give electrode active material having a high discharge energy and an electric potential capable of performing repeated charge-discharge cycles. The activation of the positive electrode material means the material placed on the positive electrode side is charged so as to aquire high electric potential to show a high discharge energy enough for the desired repeatable charge-discharge cycles. For the lithium manganese oxide of $LiMn_2O_4$ or its composition placed on the positive electrode side, the enough high electric potential is more than 3.8 volts, more specifically 4.2 volts, against the Li ion. Under the condition of electric potential of more than 4.2 volts, more than 0.9 equivalent, specifically more than 0.95 equivalent for 4.3 volets, of the lithium ion in the matrix of $LiMn_2O_4$ is released. However, the amount of the releasable lithium ion (which corresponds to charge capacity) from $LiMn_2O_4$ per se is lower thin $LiCoO_4$ by 10 to 20%, when is compared under the same weight level. Because the metal oxide which requires an increased amount of lithium ion (which means to have a large capacity for electric charging) for activation is employed as the negative electrode active material in the secondary battery of the invention, the amount of lithium ion releasable from the positive electrode active material precursor should be larger. Accordingly, the $Li_{1+x}Mn_2O_4$ which has an increased amount of lithium ion is required to increase the amount of releasable lithium ion so as to allow intercalation of an increased amount of lithium ion into the negative electrode active material precursor.

In the present invention, the $Li_{1+x}Mn_2O_4$ which is a precursor of the positive electrode active material should be produced in the container of the final battery product to be actually employed for the repeated discharge-charge cycles.

According to the invention, the positive electrode active material precursor is produced in the container by electrochemical self-discharge between lithium manganese oxide and a lithium metal or a lithium alloy. Otherwise, the positive electrode active material precursor is produced in the container by electrochemical discharge between lithium manganese oxide and a lithium metal or a lithium alloy which is placed near the negative electrode active material precursor, utilizing an externally set electric circuit. Details are described below.

(1) Use of lithium metal or alloy arranged on positive electrode side

This process can be performed by one of the following processes.

1) The lithium metal or its alloy is deposited on a collector of positive electrode having the lithium manganese oxide thereon to give an electric contact between the lithium metal or alloy and the lithium manganese oxide. Thus arranged electrode material is then subjected to self discharging reaction in the presence of an electrolytic solution.

2) The lithium metal or its alloy in the form of film is deposited directly on the surface of the lithium manganese oxide provided on the collector. Thus arranged electrode material is then subjected to self discharging reaction in the presence of an electrolytic solution.

3) The lithium metal or its alloy in the form of film is deposited on a surface protective layer of the lithium manganese oxide provided on the collector. The surface protective layer is made of electroconductive material. Thus arranged electrode material is then subjected to self discharging reaction in the presence of an electrolytic solution.

The processes 2) and 3) are preferred. Mst preferred is the process 3), because the electroconductive protective layer can releave progress of quick exothamic reaction.

(2) Use of lithium metal or alloy arranged on negative electrode side

This process can be performed by one of the following processes.

1) The lithium metal or its alloy is deposited on a collector of negative electrode having the negative electrode active material precursor thereon, preferably, to give an electric contact between the lithium metal or alloy and the precursor. Thus arranged electrode material is then subjected to discharging reaction in the presence of an electrolytic solution utilizing an externally set electric circuit to produce lithium ions from the lithium metal or alloy and intercalate them into the lithium manganese oxide on the positive electrode side.

2) The lithium metal or its alloy in the form of film is deposited directly on the surface of the negative electrode active material precursor provided on the collector. Thus arranged electrode material is then subjected to discharging reaction in the presence of an electrolytic solution utilizing an externally set electric circuit to produce lithium ions from the lithium metal or alloy and intercalate them into the lithium manganese oxide on the positive electrode side.

3) The lithium metal or its alloy in the form of film is deposited on a surface protective layer of the negative electrode active material precursor provided on the collector. The surface protective layer is made of electroconductive material. Thus arranged electrode material is then subjected to discharging reaction in the presence of an electrolytic solution utilizing an externally set electric circuit to produce lithium ions from the lithium metal or alloy and intercalate them into the lithium manganese oxide on the positive electrode side.

The processes 2) and 3) are preferred. Most preferred is the process 3), because the electroconductive protective layer can releave progress of quick exothamic reaction.

In the positive electrode active material precursor of $Li_{1+x}Mn_2O_4$ of the invention, x preferably is under the condition of $0.3<x<1$. More preferably is $0.5<x\leq0.9$, if the lithium ion secondary battery of the invention is to give a higher charge capacity per volume than $LiCoO_2$ which is known as a positive electrode active material to have a high charge capacity.

The positive electrode active material precursor is preferably converted into a positive electrode active material of the formula of $Li_yMn_2O_4$ under the condition of $0<y<0.3$, more preferably $0<y<0.2$ for increaing the discharge capacity.

In the lithium ion secondary battery of the invention, the lithium manganese oxide in the positive electrode active material preferably keeps the formula of $Li_yMn_{24}$ er the condition of $0<y<1$, more preferably $0<y<0.9$, in the repeated charge-discharge cycles so that the desired high electric potential can be maintained. The value of "y" is kept under "1".

The lithium metal or lithium alloy employed for the preparation of the positive electrode active material preferably has a high lithium content such as a lithium content of higher than 95%. The lithium metal preferably is in the form of a thin film (or foil) having uniform thickness. The thickness preferably is in the range of 10 to 100 μm. Examples of the lithium alloy include Li-Al, Li-Al-Mn, Li-Al-Mg, Li-Al-Sn, Li-Al-In, and Li-Al-Cd. The lithium or its alloy is preferably deposited on the lithium manganese oxide (precursor for the preparation of the positive electrode active material precursor) or the negative electrode active material precursor directly or via an electroconductive protective layer in a dry gas atmosphere.

In the preparation of the lithium ion secondary batter of the invention, other negative electrode active materials can be employed in combination with the metal oxide. Examples of such other active materials include lithium metal, lithum alloys, and carbonaceous material which can absorb and desorb lithium ion or lithium metal. The lithium metal and its alloys described herein are not employed as the negative electrode active material but only for releasing lithium ions to give the positive electrode active material precursor in the container, as described hereinbefore.

The lithium ion secondary battery of the invention can be manufactured in the conventional way using the materials described above. In the manufacturing the secondary battery, other materials and elements can be further incorporated together with the elecrode materials and the electrolytic solution.

The lithium ion secondary battery of the invention can be manufactured to give secondary batteries in various types such as cylinder, coin, button, sheet, and square.

FIG. 1 in the attached drawing, a lithium ion secondary battery of a representative cylinder type is illustrated, in which 11 denotes a container of battery (i.e., battery can); 8 and 9 denote a positive electrode sheet and a negative electrode sheet, respectively; 10 denotes a separater for separating the positive electrode sheet 8 and the negative electrode sheet 9; 13 denotes an electrolytic solution, it denotes a gasket, 12 denotes a cap (i.e., battery cap which also serves as a terminal of positive electrode), and 14 denotes a safety valve. The positive electrode sheet 8 and the negative electrode sheet 9 are laminated via the separater 10 and wound together spirally.

Each of the positive electrode sheet and the negative electrode sheet can be prepared by coating a mixture of the materials for the preparation of the electrode active material such as lithium manganese oxide, precursor, electroconductive material, binder, and filler on a collector. The mixture is generally called "electrode mixture". The mixture is coated on the collector in the form of a solution and then dried.

Exauples of the electroconductive materials are electron-conductive materials which are chemically stable in the battery and include naturally produced graphites such as flake graphite, massive graphite, synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electroconductive material incorporated into the electrode material is generally not more than 50 wt. %, preferably 1 to 50 wt. %, more preferably 2 to 30 wt. %. When carbon or graphite is employed, its amount preferably is in the range of 2 to 15 wt. %.

Examples of the binders include polysaccrides, thermopolastic resins, and elastic polymers, such as starch, polyvinyl alcohol, carboxymethyl cellulose, hydroxypropylcellulose, regenerated cellulose, diacetyl cellulose, polyvinyl chloride, polyvinyl pirrolidone, tetrafluoroethylene, poly fluorinated vinylidene, polyethylene, polypropylene, ethylene-propoylene-diene terpolymer (EPDM), sulfonated EPDM, styrene-butadine rubber, polybutadine, fluorinated rubber, and polyethylene oxide. These materials can be employed singly or in combination. The amount of the binder preferably is in the range of 2 to 30 wt. %.

Examples of the fillers are any fibrous materials which are chemically stable in the battery and include fibers of olefin polymers such as polypropylene and polyethylen, glass material and carbonaceous materials. The filer can be included in an amount of not more than 30 wt. %.

The electrode mixtures for the positive and negative electrodes can further contain an electrolytic solution and/or a supporint salt. For instance, an ion conductive polymer, nitromethane, and/or an electrolytic solution can be incorporated.

The collector comprises an electon-conductive material which is chemically stable in the battery. Examples of the collectors for positive electrode include sheets of stainless steel, nickel, aluminum, titanium, fired carbon, and sheet of aluminum or stainless steel which is plated with carbon, nickel, titanium or silver. Examples of the collectors for negative electrode include sheets of stainless steel, nickel, copper, titanium, aluminum, fired carbon, sheet of copper or stainless steel which is plated with carbon, nickel, titanium or silver, and Al-Cd alloy. The collectors can be oxidized on their surfaces. The collectors can be made in varous forms such as sheet, foil, film, net, punched sheet, porous body and sheet, and combined fibers (fibrous mass). The thickness of the collector generally is in the range of 5 to 100 μm.

The electrolyte solution comprises a non-protonic organic solvent and a lithium salt (namely, electrolyte) soluble in the solvent. Examples of the organic solvents include propylene carbonate, ethylene carbonate, butylene carbonate, dimethyl carbonate, diethyl carbonate, γ-butylolactone, 1,2-dimethoxyethane, tetrahydrofuran, 2-methyltetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulforane, 3-methyl-2-oxazolidinone, propylene carbonate derivatives, tetrahydrofuran derivatives, diethyl ether, and 1,3-propane sultone. These solvents can be employed singly or in combination. Examples of the lithium salts include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, Chloroborane lithium, and lithium tetraphenylborate. These lithium salts can be employed singly or in combination.

Preferred is an electrolytic solution of $LiCF_3SO_3$, $LiClO_4$, $LiBF_4$ and/or $LiPF_6$ in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-dimethoxyethane and diethyl carbonate are preferably mixed in the ratio of 0.4/0.6 to 0.6/0.4. The concentration of the electrolyte preferably is in the range of 0.2 to 3 moles per one liter of the electrolytic solution.

The electrolytic solution can contain one or more organic solid electrolytes. Examples of the employable organic solide electrolyte include polyethylene oxide derivatives, polymers having polyethylene oxide unit, polypropylene oxide derivatives, polymers having polypropylene oxide unit, polymers having ion releasable group, a mixture of a polymer having ion releasable group and the aformentioned non-protonic electrolyte, and phosphoric ester polymers. The electrolytic solution may contain polyacrylonitrile. Also known is a combination of inorganic and organic solid electrolytes, as described in Japanese Patent Provisional Publication No. 60 (1985)1768.

The electrolytic solution can further contain ore or more materials mentioned below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N,N'-substituted imidazolidinone, ethylene glycol dialkyl ether, quaternary ammonium salts, polyethylene glycol, pyrrole, 2-methoxyethanol, aluminum trichloride, electroconductive polymer, monomers of electrolide active materials, triethylene phosphoneamide, trialkylphosphine, morpholine, aryl compounds having carbonyl group, hexamethylphosphoric triamide, 4-alkylmorpholine, bicyclic tertiary amines, oils, quaternary phosphonium salts, and tertiary sulfonium salts. A halogen-containing solvents such as carbon tetrachloride or trifluorinated chlorinated ethylene can be incorporated into the electrolytic solution so as to render the battery incombustible. Carbon dioxide gas may be incorporated into the electrolytic solution to improve the battery in its resistance in high temperature storage.

The separator is an electro-insulating thin film having a high ionic permeation rate and an appropriate physical strength. For instance, a sheet or non-woven sheet made of an olefinic polymer such as polypropylene and polyethylene, or glass fiber can be employed. The pore sizes of the separator generally is in the range of 0.01 to 10 μm. The thickness of the separator generally is in the range of 5 to 300 μm. If a solide electrolytic material such as polymer is employed as the electrolyte, the electrolyte can serve as the separator.

The surface of the positive electrode active material can be modified. For instance, the surface of the lithium manganese oxide is treated with an esterifying agent or a chelating agent or coated with an electroconductive polymer or polyethylene oxide. The surface of the negative electrode active material can be also modified, for instance, by coating its surface with an ion conductive polymer or a polyacetylene layer or treated with a lithium salt.

The electrode mixture can be processed to give pellets. In the manufacture of the secondary battery of cylinder, coin or square, the electrode mixture is coated on the collector, dehydrated, dried, and pressed to give a sheet. The pressed dry sheet preferably has a thickness of 10 to 500 μm.

The lithium ion secondary battery (i.e., non-aqueous lithium ion secondary battery) of the invention can be utilized in various products and devices. Examples are handy personal computers (color or monochromatic), personal computers for inputting with pen, palm-top personal computers, note-type word processors, handy word processors, players for electronically playable book, handy phones, cordless phones (separated phones), pagers, hady terminals, handy facsimiles, handy copying machines, handy printers, head-phone stereos, video movies, liquid crystal television sets, handy cleaners, potable CD players, mini-disk players, electric shavers, electronic interpreters, phones for automobiles, transceivers, electrically actuatable tools, electronic pocket notes, electronic calculators, memory cards, tape recorders, radio sets, and back-up electric sources. The secondary battery is also employable for motor cars, electric cars, motors, illuminating devices, toys, machines for amusemnent game, road conditioners, iron devices, watches, strobos, cameras, medical equipments (pace makers, hearing aids, Tmassaging devices). The secondary battery is further employable in the fields of space technology and military area. The secondary battery can be employed in combination with other electric sources such as solar battery.

The present invention is further described in the following non-limitative examples.

Synthesis of Negative Electrode Active Material Precursor (1) $SnB_{0.5}P_{0.5}O_3$ (Compound A-1)

SnO (67.4 g), $B_2O_3$ (17.4 g), and $Sn_2P_2O_7$ (102.8 g) were mixed and pulvelized in an automatic mortar. The pulvelized mixture was placed in an alumina crucible and fired at 1,000° C. for 10 hours under argon gas atmosphere. After the firing was complete, the mixture was cooled rapidly at a rate of 100° C./min., to give the negative electrode active material of $SnB_{0.5}P_{0.5}O_3$ as transparent yellowish glass. The X-ray diffraction measurement indicated that no diffraction lines to be assigned to any crystal structures were observed, and that the obtained oxide was amorphous.

(2) In the same manner as above, the following negatie electrode active material precursors were obtained.

$Sn_{1.5}K_{0.2}PO_{3.5}$ (Compound A-2)

$SnAl_{0.1}B_{0.5}P_{0.5}Mg_{0.1}F_{0.2}O_{3.15}$ (Copound A-3)

Preparation of Lithium Manganese Oxide for Preparing Positive Electrode Active Material Precursor (1) $Li_{1.02}Mn_2O_4$ of spinel crystal structure (Compound C-1)

Electrolytically synthesized manganese dioxide (EMD, particle size: 5 to 50 μm, BET specific surface area: 40–70 m²/g, containg less than 1 wt. % of $Mn_2O_3$ and $Mn_3O_4$, and less than 3 wt. % of sulfates and water) and lithiumn hydroxide (which was beforehand pulverized to give a mean particle size of 1–10 μm) were mixed in a molar ratio of 1.02/2 (in terms of Li/Mn) by a wet or dry method, and dried at 100° C. for one hour. The dry mixture was heated to 400°–600° C. for 3 hours, and the heated mixture was again pulverized and fired at 700° C. for 48 hours under atmospheric conditions. Thus fired product was slowly cooled to room temperature at a rate of 2° C./min. The cooled product was again pulverized in an automatic mortar to give a powdery product having a primary particle size of 0.5 μm and a secondary particle size of 8 to 20 μm (median size: 12.5 μm). BET specific surface area was 2 to 4 m²/g, which depended upon the pulverizing conditions.

The crystal structure and composition of the resulting product was identified using ICP and X-ray diffraction measurement, which indicated that the fired product was $Li_{1.02}Mn_2O_4$ having spinel crystal structure. The X-ray diffraction measurement indicated that the half width of the diffraction peak at 2θ=36° (Cu α-rays) was approximately 0.3, and its strength was 28% of the peak at 2θ=18.6°. The lattice constant of "a" axis of the crystal was 8.22 Å. Further, it was revealed that the fired product contained a small amount of $LiMnO_2$. Five grams of the fired product was dispersed in 100 mL of pure water and pH value of the dispersion was measured to give pH 8.0.

(2) $Li_2Mn_4O_9$ (Compound C-2) and $Li_4Mn_5O_{12}$ (Compound C-3)

The above-mentioned procedures were repeated except that the firing was conducted by one step at 650° C. for 48 hours in a atmospheric condition and the mixing ratio (Li/Mn) was changed to give $Li_2Mn_4O_9$ (Compound C-2) and $Li_2Mn_5O_{12}$ (Compound C-3). Both had a deformed spinel crystal structure. The median size was 9 μm for $Li_2Mn_4O_9$ and 20 μm for $Li_4Mn_5O_{12}$.

(3) $Li_2CoO_2$ (Compound C-4; sub-active material for positive electrode)

A mixture of $Co_3O_4$ and $Co_2O_3$ and lithium carbonate were mixed in a molar ratio of 1.05 (Li/Co). The resulting mixture was fired at 600° C. for 4 hours and subsequently at 880° C. for 8 hours in an atmospheric condition. The fired product was pulverized in an automatic mortar to give a powdery product having a median size of 6 μm and BET specific surface area of 0.5 m²/g. X-Ray diffraction analysis indicated that the fired product was $LiCoO_2$. pH value determined in the above-described method was 10.5.

(4) $LiNi_{0.8}Co_{0.2}O_2$ (Compound C-5; sub-active material for positive electrode)

Nickel oxide was added to the mixture of the (2) above and firing was performed at 800° C. for 48 hours in an oxygen atmosphere to give the $LNi_{0.8}Co_{0.2}O_2$.

Peparation of Electrode Mixture Sheet (1) Positive electrode mixture sheet

The compound C-1 (87 wt. %), flake graphite (6 wt. %), acetylene black (3 wt. %), and a binder (composition of 3 wt. % of polytetrafluoroethylene in water and 1 wt. % of sodium polyacrylate) were kneaded after addition of water. The resulting slurry was coated on both sides of an aluminum film (thickness: 20 μm). The coated aluminum film was dried and pressed to give the desired positive electrode mixture sheet (coated amount: approximately 340 g/m², thickness: approximately 120 μm).

(2) Negative electrode mixture sheet

The compound A-1 (86 wt. %), flake graphite (6 wt. %), acetylene black (3 wt. %), and a binder (composition of 4 wt. % of styrene-butadiene rubber in water and 1 wt. % of carboxy methyl cellulose) were kneaded after addition of water. The resulting slurry was coated on both sides of a copper film (thickness: 18 μm). The coated copper film was dried and pressed to give the desired positive electrode mixture sheet (coated amount: approximately 70 g/m², thickness: approximately 30 μm).

Preparation of Secondary Battery of Cylinder Form
[Referential Battery No. 1]

The positive electrode mixture sheet was cut to give a strip having a width of 35 mm, and the negative electrode mixture sheet was cut to give a strip having a width of 39 mm. To the end of each sheet was spot welded a leading plate of aluminum or nickel, respectively, and dehydrated and dried at 150° C. for 2 hours in a dry atmospheric condition of a dew point of −40° C.

Both electrode sheets were installed in a nickel-plated cylinder battery container, in the manner as illustrated in FIG. 1. The separator was a porous propylene film (Cellgard 2400, available from Cellanese Corporation). In the container which also served as the negative electrode terminal, an electrolytic solution of 1 mole of $LiPF_6$ in 1 liter of a mixture of ethylene carbonate, butylene carbonate and dimethyl carbonate (2:2:6, volume ratio) was placed. The battery cap was fixed via a gasket. The positive electrode terminal and the positive electrode mixture sheet, as well as the negative electrode terminal and the container, were connected to each other, as described above.

The resulting battery composition (which was a battery precursor) had a diameter of 14 mm and a hight of 50 mm. The battery was equipped with a safety valve.

[Referential Batteries Nos. 2 to 5]

Referential batteries Nos. 2 to 5 were prepared in the same maer as above, except that the comound C-5 1 was replaced with the coods C-2, C-3, a combination of the compounds C-1 and C-4 (2:1, by weight), or a combination of the compunds C-1 and C-5 (2:1, by weight), and the compound A-1 was replaced with the compound A-2 or A-3, as is set forth in Table 1.

[Battery Precursors Nos. 6 to 10, according to Invention]

A lithium metal foil of 30 μm thick was sliced to give a strip of 20 mm (width) and 320 m (length). It weighed approximately 100 mg. The strip was further cut in the longitudinal direction to give narow strips (4 mm width). In a dry atmospheric condition (dew point: −60° C.), the lithium strips were placed on both surfaces of layers of the compound C-1, C-2, or C-3 of the positive electrode mixture sheet at certain spaces, and then the lithium strips were pressed on the surfaces using a press roller.

A lithium metal foil of 30 μm thick (same as above) was sliced to give a strip of 14 mm (width) and 320 mm (length). It weighed approximately 70 mg. In the same atmospheric condition, the lithium strips were placed on both surfaces of layers of the compounds C-1 and C-4, or the compounds C-1 and C-5 of the positive electrode mixture sheet, and then the lithium strips were pressed on the surfaces using a press roller.

Thus prepared positive electrode mixture sheet equipped with lithium metal strips was placed in the container, to give a lithium ion secondary battery precursor (Nos. 6 to 10) according to the invention.

[Battery Precursors Nos. 11 to 15 according to Invention]

On the surface of the coated layer of the positive electrode mixture sheet, a mixture of flake graphite and aluminum oxide (1:4, weight ratio) was coated to give an electroconductive protective layer (mean thickness: 5 µm). On the surface of the protective layer was placed and fixed the same lithium metal strip (width: 20 mm, length: 320 mm, weight: approximately 100 mg).

Thus prepared positive electrode mixture sheet equipped with lithium metal strips on the protective layer was placed in the container, to give a lithium ion secondary battery precursor (Nos. 11 to 15) according to the invention.

(Battery Precursors Nos. 16 & 17 according to Invention)

On an exposed area of the surface of the aluminum film (i.e., collecter) of the positive electrode mixture sheet, an electroconductive carbon was deposited in vacuum to give a carbon deposited layer of 10 µm thick. On the carbon deposited layer was pressed a lithium metal foil (100 µmg) having a thickness of 200 µm using a press roller. Thus, a positive electrode mixture sheet provided with a lithium metal on its collector surface was prepared.

Thus prepared positive electrode mixture sheet provided with lithium metal was placed in the container, to give a lithium ion secondary battery precursor (Nos. 16 and 17) according to the invention.

[Preparation of lithium ion secondary batteries Nos. 6 to 17 according to Invention]

The secondary battery precursor of the invention was aged at 40° C. to cause self-discharging on the positive electrode side to producing lithium ions from the lithium metal and intercalating the lithium ions into the lithium manganese oxide on the positive electrode side before starting the charge-discharge procedure. The aging was performed for 1 day for the battery precursors Nos. 6 to 15, and for 7 days for the battery precursos Nos. 16 to 17.

[Battery Precursors Nos. 18 to 22, according to Invention]

A lithium metal foil of 35 µm thick was sliced to give a strip of 20 mm (width) and 320 mm (length). It weighed approximately 100 mg. In a dry atmospheric condition (dew point: –60° C.), the lithium strips were placed on both surfaces of layers of the compound A-1, C-2, or C-3 of the negative electrode mixture sheet, and then the lithium strips were pressed on the surfaces using a press roller.

Thus prepared negative electrode mixture sheet equipped with lithium metal strips was placed in the container, to give a lithium ion secondary battery precursor (Nos. 18 to 22) according to the invention.

[Battery Precursors Nos. 23 to 27 according to Invention]

On the surface of the coated layer of the negative electrode mixture sheet, a mixture of flake graphite and aluminum oxide (1:4, weight ratio) was coated to give an electroconductive protective layer (mean thickness: 5 µm). On the surface of the protective layer was placed and fixed the same lithium metal strip of 35 µm thick (width: 20 mm, length: 320 mm, weight: approximately 100 mg).

Thus prepared positive electrode mixture sheet equipped with lithium metal strips on the protective layer was placed in the container, to give a lithium ion secondary battery precursor (Nos. 23 to 27) according to the invention.

[Battery Precursors Nos. 28 & 29 according to Invention]

On an exposed area of the surface of the copper film (i.e., collecter) of the negative electrode mixture sheet, a lithium metal foil (thickness: 200 µm) was fixed using a press roller to give a negative electrode mixture sheet provided with a lithium metal on its collector surface was prepared.

Thus prepared negative electrode mixture sheet provided with lithium metal was placed in the container, to give a lithium ion secondary battery precursor (Nos. 28 and 29) according to the invention.

[Preparation of lithium ion secondary batteries Nos. 18 to 29 according to Invention]

The secondary battery precursor of the invention (Nos. 18 to 29) was aged at room temperature for 5 hours at 40° C., and then equipped with an external electric circuit. Electric discharge of the battery precursor was performed using the external electric circuit at a constant electric current of 0.1 A. The electric discharge was continued until the open electric motive force reached 0.2V using a low electric current. Thus treated battery precursor was aged at 40° C. for 2 days.

Before starting the charge-discharge cycles, the aged battery precursor was checked and confirmed that the lithium metal remaining on the negative electrode collector disappeared and intercalated into the negative electrode active material precursor.

Evaluation of Lithium Ion Secondary Battery

The lithium ion secondary battery precursor of the invention (Nos. 6 to 17) was evaluated in its discharge capacity by repeated charge-discharge cycles under the conditions that the voltage at which the charging was stopped at 4.2 volts, the voltage at which the discharging was stopped at 2.7 volts, and electric currents for the charging and dischargi were 1 mA/cm$^2$.

The lithium ion secondary battery precursor of the invention (Nos. 18 to 29) was evaluated in its discharge capacity by repeated charge-discharge cycles under the conditions that the voltage at which the charging was stopped at 4.2 volts, the voltage at which the discharging was stopped at 2.8 volts, and electric currents for the charging and discharging were 1 mA/cm$^2$.

Table 1 indicates the combinations of the precursors of the positive and negative electrode active materials, the dicharge capacity, and the mean voltage in the discharging step.

Table 2 indicates that the variation of the compositions of the lithium manganese oxides in some battery samples. The variation was determined by breaking down the battery precursor before the charge was started just after the aging, using ICP emission analysis and X-ray diffraction measurement. The same analysis and measurement were again performed on the battery after the repeated discharge-charge cycles which were conducted after the initial charging of the precursor up to 4.2 volts.

The initial activation of the positive electrode active material (i.e., initial charging) was performed in every case so deep that the copsition of the lithium manganese oxide varies in the range of $Li_{0.05-0.10}Mn_2O_4$. When the activation was not performed so deep, and the variation of the composition was in the range of $Li_{>0.30}Mn_2O_4$, the discharge capacity of the battery lowered extremely, such as by more than 30%.

In the following Table 1, (I) means that Li metal was deposited on the lithium manganese oxide layer or the negative electrode active material precursor layer, (II) means that Li metal was deposited on the protective layer, and (III) means that Li metal was deposited on the collector.

TABLE 1

| No. | Positive electrode (Li) | Negative electrode (Li) | Discharge capacity (Ah) | Discharge voltage (V) |
|---|---|---|---|---|
| Reference | | | | |
| 1 | C-1 (none) | A-1 (none) | 0.42 | 3.65 |
| 2 | C-2 (none) | A-3 (none) | 0.43 | 3.65 |
| 3 | C-3 (none) | A-2 (none) | 0.44 | 3.66 |
| 4 | C-1/4 (none) | A-1 (none) | 0.50 | 3.55 |
| 5 | C-1/5 (none) | A-1 (none) | 0.53 | 3.50 |
| Invention (Li-deposited) | | | | |
| 6 | C-1 (I) | A-1 (none) | 0.50 | 3.65 |
| 7 | C-2 (I) | A-3 (none) | 0.47 | 3.65 |
| 8 | C-3 (I) | A-2 (none) | 0.49 | 3.65 |
| 9 | C-1/4 (I) | A-1 (none) | 0.55 | 3.55 |
| 10 | C-1/5 (I) | A-1 (none) | 0.56 | 3.66 |
| 11 | C-1 (II) | A-1 (none) | 0.51 | 3.66 |
| 12 | C-2 (II) | A-3 (none) | 0.48 | 3.66 |
| 13 | C-3 (II) | A-2 (none) | 0.50 | 3.66 |
| 14 | C-1/4 (II) | A-1 (none) | 0.56 | 3.56 |
| 15 | C-1/5 (II) | A-1 (none) | 0.56 | 3.51 |
| 16 | C-1 (III) | A-1 (none) | 0.49 | 3.65 |
| 17 | C-1/5 (III) | A-1 (none) | 0.53 | 3.50 |
| 18 | C-1 (none) | A-1 (I) | 0.50 | 3.65 |
| 19 | C-2 (none) | A-3 (I) | 0.48 | 3.65 |
| 20 | C-3 (none) | A-2 (I) | 0.49 | 3.65 |
| 21 | C-1/4 (none) | A-1 (I) | 0.54 | 3.55 |
| 22 | C-1/5 (none) | A-1 (I) | 0.55 | 3.52 |
| 23 | C-1 (none) | A-1 (II) | 0.51 | 3.65 |
| 24 | C-2 (none) | A-3 (II) | 0.47 | 3.66 |
| 25 | C-3 (none) | A-2 (II) | 0.50 | 3.66 |
| 26 | C-1/4 (none) | A-1 (II) | 0.55 | 3.56 |
| 27 | C-1/5 (none) | A-1 (II) | 0.55 | 3.50 |
| 28 | C-1 (none) | A-1 (III) | 0.48 | 3.65 |
| 29 | C-1/5 (none) | A-1 (III) | 0.53 | 3.50 |

TABLE 2

| Battery No. | Positive Electrode Active Material Precursor (self-discharged) | Variation in the charge-discharge cycles |
|---|---|---|
| 6 | $Li_{1.7}Mn_2O_4$ | $Li_{0.1-0.85}Mn_2O_4$ |
| 7 | $Li_{1.6}Mn_2O_4$ | $Li_{0.1-0.83}Mn_2O_4$ |
| 8 | $Li_{1.8}Mn_2O_4$ | $Li_{0.1-0.84}Mn_2O_4$ |
| 14 | $Li_{1.7}Mn_2O_4$ | $Li_{0.1-0.90}Mn_2O_4$ |
| 15 | $Li_{1.7}Mn_2O_4$ | $Li_{0.1-0.85}Mn_2O_4$ |
| 16 | $Li_{1.7}Mn_2O_4$ | $Li_{0.1-0.85}Mn_2O_4$ |
| 23 | $Li_{1.7}Mn_2O_4$ | $Li_{0.1-0.86}Mn_2O_4$ |
| 24 | $Li_{1.6}Mn_2O_4$ | $Li_{0.1-0.83}Mn_2O_4$ |
| 23 | $Li_{1.8}Mn_2O_4$ | $Li_{0.1-0.85}Mn_2O_4$ |

The results in Table 1 indicate that the lithium ion secondary batteries of the invention which were produced by intercalating lithium ions into the lithium manganese oxide (for the preparation of the positive electrode active material precursor) in the container of the battery using the lithium metal deposited on the positive or negative electrode precursor sheets to produce the positive electrode active material precursor and then charging the battery to releasing lithium ions from the positive electrode from the positive electrode active material precursor and intercalating the released lithium ions into the negative electrode active material precursor give a well balanced dicharge capacity and discharge voltage.

What is claimed is:

1. A lithium ion secondary battery comprising a positive electrode, a negative electrode non-aqueous electrolyte and a container sealing the electrodes and electrolyte therein, wherein the positive electrode comprises a positive electrode active material which has a cubic crystal structure, is represented by the formula of $Li_yMn_2O_4$ wherein $0<y<0.3$ and is produced by electrochemically intercalating lithium ions into lithium manganese oxide in the container to give a positive electrode active material precursor which has a tetragonal crystal structure and is represented by the formula of $Li_{1+x}Mn_2O_4$ wherein $0.3<x<1$ and then releasing lithium ions from the positive electrode active material precursor in the container;

and the negative electrode comprises a negative electrode active material which is produced by intercalating the released lithium ions into a negative electrode active material precursor comprising a metal oxide in the container.

2. The lithium ion secondary battery of claim 1, wherein the positive electrode contains, as a sub-active material, lithium cobalt oxide having the formula of $Li_xCoO_2$ under the condition of $0.5<x\leq1$, or lithium nickel or cobalt-nickel oxide having the formula of $Li_xCo_yNi_zO_2$ under the conditions of $0.5<x\leq1$, $0\leq y\leq1$, and $0<z\leq1$.

3. The lithium ion secondary battery of claim 1, wherein the positive electrode active material precursor is produced in the container by electrochemical self-discharge between lithium manganese oxide and a lithium metal or a lithium alloy.

4. The lithium ion secondary battery of claim 1, wherein the positive electrode active material precursor is produced in the container by electrochemical discharge between lithium manganese oxide and a lithium metal or a lithium alloy which is placed near the negative electrode active material precursor, utilizing an externally set electric circuit.

5. The lithium ion secondary battery of claim 1, wherein the negative electrode active material precursor comprises an amorphous metal oxide which has a tin atom and at least one other metal atom and into which the lithium ions have been intercalated.

6. The lithium ion secondary battery of claim 1, wherein the negative electrode active material precursor comprises an amorphous metal oxide which has a tin atom and at least one other metal atom and which is represented by the formula of $SnL_kO_z$ in which L is at least one atom selected from the group consisting of Al, B, P, Si, Li, Na, K, Rb, Cs, Be, Mg, Ca, Sr, Ba, Sc, Y, lanthanides, and halogens, and k and z are numbers satisfying the condition of $0.2\leq k\leq2$ and $1\leq z\leq6$, respectively, or the formula of $Sn_dQ_{1-d}L_kO_z$ in which Q is a transition metal atom, L is at least one atom selected from the group consisting of Al, B, P, Si, Li, Na, K, Rb, Cs, Be, Mg, Ca, Sr, Ba, Sc, Y, lanthanides, and halogens, and d, k and z are numbers satisfying the condition of $0.1\leq d\leq0.9$, $0.2\leq k\leq2$, and $1\leq z\leq6$, respectively.

7. The lithium ion secondary battery of claim 1, wherein the ratio of the amount of lithium ions to be released from the negative electrode active material until the discharge voltage of the battery lowers to 3V in a discharge step, to the amount of lithium ions intercalated into the negative electrode active material precursor is lower than $1/(1+x)$.

8. The lithium ion secondary battery of claim 1, wherein the positive electrode active material is activated.

9. A lithium ion secondary battery precursor comprising a positive electrode precursor, a negative electrode precursor, non-aqueous electrolyte, and a container sealing the electrode precursors and electrolyte therein, wherein the positive electrode precursor comprises a positive electrode active material precursor which has a tetragonal crystal structure and is represented by the formula of $Li_{1+x}Mn_2O_4$ wherein $0.3<x<1$ and is produced by electrochemically intercalating lithium ions into lithium manganese oxide in the container to increase the lithium ion content of the lithium manganese oxide; and the negative electrode precursor comprises a negative electrode active material precursor comprising a metal oxide.

10. The lithium ion secondary battery precursor of claim 9, wherein the positive electrode precursor contains, as a sub-active material, lithium cobalt oxide having the formula of $Li_xCoO_2$ under the condition of $0.5<x\leq1$, or lithium nickel or cobalt-nickel oxide having the formula of $Li_xCo_yNi_zO_2$ under the conditions of $0.5<x\leq1$, $0\leq y\leq1$, and $0<z\leq1$.

11. The lithium ion secondary battery precursor of claim 9, wherein the positive electrode active material precursor is produced in the container by electrochemical self-discharge between lithium manganese oxide and a lithium metal or a lithium alloy.

12. The lithium ion secondary battery precursor of claim 9, wherein the positive electrode active material precursor is produced in the container by electrochemical discharge between lithium manganese oxide and a lithium metal or a lithium alloy which is placed near the negative electrode active material precursor, utilizing an externally set electric circuit.

13. The lithium ion secondary battery precursor of claim 9, wherein the negative electrode active material precursor comprises an amorphous metal oxide which has a tin atom and at least one other metal atom.

14. The lithium ion secondary battery precursor of claim 9, wherein the negative electrode active material precursor comprises an amorphous metal oxide which has a tin atom and at least one other metal atom and which is represented by the formula of $SnL_kO_z$ in which L is at least one atom selected from the group consisting of Al, B, P, Si, Li, Na, K, Rb, Cs, Be, Mg, Ca, Sr, Ba, Sc, Y, lanthanides, and halogens, and k and z are numbers satisfying the conditions of $0.2\leq k\leq2$ and $1\leq z\leq6$, respectively, or the formula of $Sn_dQ_{1-d}L_kO_z$ in which Q is a transition metal atom, L is at least one atom selected from the group consisting of Al, B, P, Si, Li, Na, K, Rb, Cs, Be, Mg, Ca, Sr, Ba, Sc, Y, lanthanides, and halogens, and d, k and z are nuubers satisfying the conditions of $0.1\leq d\leq0.9$, $0.2\leq k\leq2$, and $1\leq z\leq6$, respectively.

15. A lithium ion secondary battery precursor comprising a positive electrode precursor, a negative electrode precursor, non-aqueous electrolyte, and a container sealing the electrode precursors and electrolyte therein, wherein the positive electrode precursor comprises lithium manganese oxide which has a spinel crystal structure, is represented by the formula of $Li_{1+x}(Mn_{2-y})O_4$ wherein $0\leq x<1.7$ and $0\leq y<0.7$, or the formula of $Li_{1-x}(Mn_{2-y})O_4$ wherein $0\leq x\leq1.0$ and $0\leq y<0.5$, and has a lithium metal or a lithium alloy in the vicinity of the lithium manganese oxide under the condition that the lithium metal or lithium alloy is in electric contact with the lithium manganese oxide; and the negative electrode precursor comprises a negative electrode active material precursor comprising a metal oxide.

16. The lithium ion secondary battery precursor of claim 15, wherein the positive electrode precursor contains, as a sub-active material, lithium cobalt oxide having the formula of $Li_xCoO_2$ under the condition of $0.5<x\leq1$, or lithium nickel or cobalt-nickel oxide having the formula of $Li_xCo_yNi_zO_2$ under the conditions of $0.5<x\leq1$, $0\leq y\leq1$, and $0<z\leq1$.

17. A lithium ion secondary battery precursor comprising a positive electrode precursor, a negative electrode precursor, non-aqueous electrolyte, and a container sealing the electrode precursors and electrolyte therein, wherein the positive electrode precursor comprises lithium manganese oxide; and the negative electrode precursor comprises a negative electrode active material comprising an amorphous metal oxide which has a tin atom and at least one other metal atom and which is represented by the formula of $SnL_kO_z$ in which L is at least one atom selected from the group consisting of Al, B, P, Si, Li, Na, K, Rb, Cs, Be, Mg, Ca, Sr, Ba, Sc, Y, lanthanides, and halogens, and k and z are numbers satisfying the conditions of $0.2\leq k\leq2$ and $1\leq z\leq6$, respectively, or the formula of $Sn_dQ_{1-d}L_kO_z$ in which Q is a transition metal atom, L is at least one atom selected from the group consisting of Al, B, P, Si, Li, Na, K, Rb, Cs, Be, Mg, Ca, Sr, Ba, Sc, Y, lanthanides, and halogens, and d, k and z are numbers satisfying the conditions of $0.1\leq d\leq0.9$. $0.2\leq k\leq2$ and $1\leq z\leq6$, respectively, and has a lithium metal or a lithium alloy in the vicinity of the negative electrode active material precursor under the condition that the lithium metal or lithium alloy is brought into electric contact with the lithium manganese oxide through an externally set electric circuit.

* * * * *